Patented Sept. 7, 1937

2,092,076

UNITED STATES PATENT OFFICE 2,092,076

DISAZO DYESTUFFS AND THEIR PRODUCTION

Arthur Howard Knight, Blackley, Manchester, England, assignor to Imperial Chemical Industries Limited, a corporation of Great Britain No Drawing. Application July 1, 1935, Serial No. 29,373. In Great Britain July 11, 1934

8 Claims. (Cl. 260—81)

This invention relates to methods of manufacturing new dyestuffs and to the dyestuffs produced thereby.

It is an object of the invention to make new dyestuffs for the coloring of cellulose acetate and other cellulose esters. Another object of the invention is to make new dyestuffs of good light fastness by a technically and economically satisfactory method. Other objects of the invention will be in part apparent and in part hereinafter more fully set forth.

The objects of the invention are accomplished, generally speaking, disazo dyestuffs having as a first component an amine of the benzene or naphthalene series without water-solubilizing substituents, as a second component an amine of the benzene or naphthalene series adapted to couple in the position para to the amino group, and as a third component one of the compounds represented by the formula:

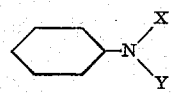

in which X is alkyl, alkoxyalkyl, or hydrogen, and Y is sulfatoethyl, sulfatopropyl, or sulfatopolyethenoxy. The objects of the invention relating to the process are accomplished, generally speaking, by diazotizing a first component, coupling it para to the amino group of the second component, diazotizing the so-formed compound, and coupling it to a third component.

According to the invention I make new disazo dyestuffs by coupling a diazotized amine of the benzene or naphthalene series with a primary amine of the benzene or naphthalene series, adapted to couple in the para position to the amino group, again diazotizing the monoazo compound so formed and coupling it with an N-alkyl-N-sulfatoalkyl- or N-beta-alkoxyethyl-N-sulfatoalkyl-amine of the benzene series, or with a sulfuric ester of N-alkyl-N-polyethenoxy-amine of the benzene series or with an N-sulfato-alkylamine of the benzene series, the components being so chosen that the resulting dyestuffs are devoid of sulfonic or carboxyl groups.

By "N-alkyl" I mean N-methyl to N-butyl, and by "sulfatoalkyl" I mean sulfatoethyl or sulfatopropyl.

Exemplary of suitable first components are aniline, o-, m-, and p-chloroanilines, o, m, and p-toluidines, 4-, and 5-chloro-2-toluidines, 1,3,4-xylidine, p-xylidine, o-anisidine, p-anisidine, p-phenetidine, o-nitroaniline, m-nitroaniline, p-nitroaniline, 2-chloro-4-nitroaniline, 4-chloro-2-nitroaniline, 5-nitro-2-anisidine, 4-nitro-2-anisidine, 4-nitro-2-toluidine, 5-chloro-2-nitroaniline, 2,4-dinitroaniline, α-naphthylamine, β-naphthylamine, 5-nitro-α-naphthylamine.

Exemplary of middle components suitable for use according to the invention are aniline, o-toluidine, and o-anisidine, coupled as ω-sulfonates and then hydrolized, m-anisidine, m-toluidine, 3-amino-4-methoxytoluene, 2,5-dimethoxyaniline, 2,5-diethoxyaniline, α-naphthylamine.

The N-beta-alkoxyethyl-N-sulfatoalkyl amines of the benzene series used as end components can be prepared as described in copending application Serial No. 19,103, filed April 30, 1935.

The sulfuric esters of N-alkyl-N-polyethenoxy-amines of the benzene series can be prepared as described in copending application Serial No. 7,660, filed February 21, 1935.

The invention is illustrated but not limited by the following examples in which the parts are by weight:

Example I 138 parts of para-nitroaniline are diazotized in the usual way and to the diazo solution so obtained is added a solution of 137 parts of 3-amino-4-methoxytoluene in 7000 parts of water and 370 parts of 10% aqueous hydrochloric acid. When coupling is complete the suspension of the aminoazo compound is diazotized at 35° C. by adding 76 parts of solid sodium nitrite. The solution of the diazoazo compound so obtained is cooled to 10° C. and added slowly to a solution at 5° C. of 245 parts of N-ethyl-N-sulfatoethylaniline in 4000 parts of water containing 40 parts of caustic soda and to which have been added 210 parts of sodium carbonate. Coupling rapidly takes place. The dyestuff suspension is warmed to 35° C., common salt is added to complete the separation of the dyestuff and the dyestuff filtered off and washed with a 5% solution of common salt. The dyestuff is either preserved as paste or dried in any suitable way. If dried it forms a dark brown powder.

It dissolves readily in hot water to a violet solution. When applied to acetate artificial silk from a neutral dye bath containing 3% salt it produces fast reddish violet shades. These are easily dischargeable.

If instead of using 245 parts of N-ethyl-N-sulfatoethylaniline, there are used 199 parts of N-sulfatoethyl-o-toluidine the dyestuff obtained gives reddish brown shades on acetate artificial silk of good fastness properties and dischargeability.

Example II

A suspension of 247 parts of benzene-azo-alpha-naphthylamine in 10,000 parts of water and 925 parts of 10% hydrochloric acid is diazotized at 0–3° C. by adding 76 parts of solid sodium nitrite and stirring the mixture for three hours. When diazotization is complete the solution of the diazo-azo compound so obtained is filtered if necessary and the filtrate added slowly to a solution at 5° C. of 245 parts of N-ethyl-N-sulfatoethylaniline in 4000 parts of water containing 40 parts of caustic soda and to which have been added 210 parts of sodium carbonate. Coupling takes place rapidly. The dyestuff is filtered off, washed with a little 5% solution of common salt and preserved as paste or dried in any suitable way. If dried it forms a dark brown powder.

It dissolves readily in hot water to a reddish brown solution and when applied to acetate artificial silk from a neutral dye bath containing 3% salt it produces crimson shades of good fastness properties and dischargeability.

Example III

If instead of 245 parts of N-ethyl-N-sulfatoethylaniline in the above example there are used 289 parts of N-beta-ethoxyethyl-N-sulfatoethylaniline a dyestuff is obtained which dyes acetate artificial silk in crimson shades of similar properties to the dyestuff of Example II.

Example IV 127.5 parts of o-chloraniline are diazotized and coupled with 153 parts of 2,5-dimethoxyaniline and the aminoazo compound so obtained diazotized, in the manner described in Example I of British Patent No. 391,862. 289 parts of the sulfuric ester of the product of condensation of 121 parts of N-ethylaniline and 86 parts (two equivalents) of ethylene oxide (prepared as described in copending application Serial No. 17,735, filed April 22, 1935) are dissolved in 4000 parts of water containing sufficient caustic soda to give a faintly alkaline reaction to Brilliant Yellow paper. 204 parts of sodium carbonate are then added and the mixture is cooled to 5° C. The cooled diazo-azo solution is then added slowly to this mixture. Coupling is rapid, the dyestuff separating from solution in a gelatinous form. When coupling is complete the dyestuff suspension is heated to 55° C., about 700 parts of common salt are added and the dyestuff, which is in the form of a tar, allowed to settle. The liquor is then poured off, the tar washed with a little 5% solution of common salt, and then dried.

The dried dyestuff forms a dark brown powder, and is readily soluble in warm water to a dark red solution. When applied to acetate artificial silk from a neutral dyebath containing 3% salt it produces fast reddish-violet shades which are easily dischargeable.

Example V 303 parts of N-beta-ethoxyethyl-N-sulfatoethyl-3-toluidine are dissolved in 4000 parts of water and sufficient caustic soda to give finally a faintly alkaline reaction to Brilliant Yellow paper. 200 parts of anhydrous sodium carbonate are then added and the solution is cooled to 5° C. To the cooled solution there is added slowly a diazotized suspension obtained in the usual way from 211 parts of aminoazotoluene.

When coupling is complete, common salt is added to precipitate the dyestuff, which is then filtered off and either preserved as a paste or dried in any suitable way. The new dyestuff is soluble in water and dyes acetate artificial silk in yellowish-red shades.

The new dyestuffs are water soluble and possess good affinity for acetate artificial silk and are used for coloring materials composed of or containing it, particularly in the form of thread. The colorations produced range from red to brown to violet in shade. The fastness properties are good. The colorations are easily dischargeable. The new dyestuffs dissolve readily in alcohol and nitrocellulose solvents. They have high tinctorial power, and hence are useful for coloring nitrocellulose lacquers, and varnishes, and in making spirit stains and quick drying inks.

As many apparently widely different embodiments of this invention may be made without departing from the spirit and scope thereof, it is to be understood that I do not limit myself to the specific embodiments thereof except as defined in the appended claims.

I claim:

1. The method which comprises coupling to a diazotized aniline without water-solubilizing substituents a diazotizable primary arylamine of the benzene or naphthalene series without water-solubilizing substituents, diazotizing the so-formed aminoazo compound and coupling thereto a compound without water-solubilizing substituents represented by the formula

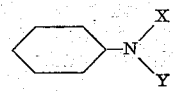

in which X is one of a group consisting of alkyl, alkoxyalkyl, and hydrogen and Y is one of a group consisting of sulfatoethyl, sulfatopropyl, and sulfatopolyethenoxy.

2. A disazo dyestuff having as a first component the radical of a diazotized amine selected from the group of compounds consisting of aniline, ortho-, meta-, and para-chloroanilines, ortho-, meta-, and para-toluidines, 4-, and 5-chloro-2-toluidines, 1,3,4-xylidine, para-xylidine, ortho-anisidine, para-anisidine, para-phenetidine, ortho-nitroaniline, meta-nitroaniline, para-nitroaniline, 2-chloro-4-nitroaniline, 4-chloro-2-nitroaniline, 5-nitro-2-anisidine, 4-nitro-2-anisidine, 4-nitro-2-toluidine, 5-chloro-2-nitroaniline, 2,4-dinitroaniline, alpha-naphthylamine, beta-naphthylamine, and 5-nitro-alpha-naphthylamine, having as a second component the radical of one of a group consisting of aniline, ortho-toluidine, and ortho-anisidine, coupled as ω-sulfonates and then hydrolized, meta-anisidine, meta-toluidine, 3-amino-4-methoxytoluene, 2,5-dimethoxyaniline, 2,5-diethoxyaniline, and alpha-naphthylamine, and having as a third component a compound represented by the formula

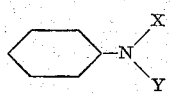

in which X is one of a group consisting of alkyl, alkoxyalkyl, and hydrogen and Y is one of a group consisting of sulfatoethyl, sulfatopropyl, and sulfatopolyethenoxy.

3. A compound represented by the formula:

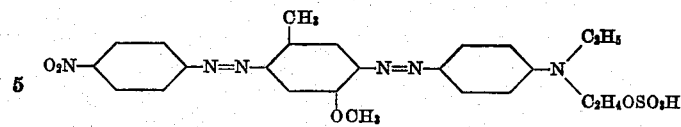

4. A compound represented by the formula:

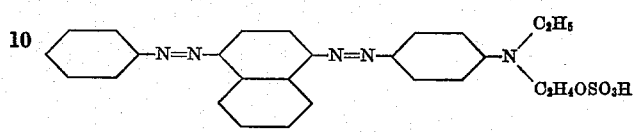

5. A compound represented by the formula:

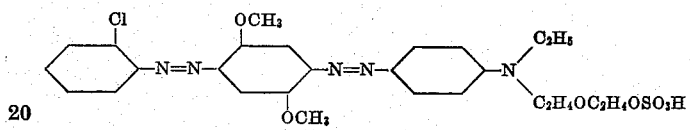

6. The process which comprises coupling diazotized para-nitroaniline to 3-amino-4-methoxy-toluene, diazotizing the resulting compound and coupling it to N-ethyl-N-sulfatoethyl-aniline.

7. The process which comprises diazotizing benzene-azo-alpha-naphthylamine and coupling it to N-ethyl-N-sulfatoethyl-aniline.

8. The process which comprises diazotizing ortho-chloro-aniline, coupling it to 2,5-dimethoxy-aniline, diazotizing the resulting compound and coupling it to the product of condensing N-ethyl-aniline with two equivalents of ethylene oxide.

ARTHUR HOWARD KNIGHT.